United States Patent [19]
Stone et al.

[11] Patent Number: 5,742,785
[45] Date of Patent: Apr. 21, 1998

[54] POSTING MULTIPLE RESERVATIONS WITH A CONDITIONAL STORE ATOMIC OPERATIONS IN A MULTIPROCESSING ENVIRONMENT

[75] Inventors: Harold Stuart Stone; Janice Murphy Stone, both of Chappaqua, N.Y.

[73] Assignee: International Business Machines Corporation, Armonk, N.Y.

[21] Appl. No.: 562,539

[22] Filed: Nov. 20, 1995

Related U.S. Application Data

[63] Continuation of Ser. No. 993,193, Dec. 18, 1992, abandoned.

[51] Int. Cl.$^6$ .............................. G06F 15/16; G06F 9/38
[52] U.S. Cl. .............. 395/393; 395/200.43; 395/800.01; 711/147
[58] Field of Search ..................... 395/800, 375, 395/427, 474, 471

[56] References Cited

U.S. PATENT DOCUMENTS

| | | |
|---|---|---|
| 4,847,754 | 7/1989 | Obermarck et al. . |
| 4,926,375 | 5/1990 | Mercer et al. . |
| 5,027,316 | 6/1991 | Frantz et al. . |
| 5,119,292 | 6/1992 | Baker et al. . |
| 5,136,691 | 8/1992 | Baror ........................ 395/200 |
| 5,136,717 | 8/1992 | Morley et al. . |
| 5,175,829 | 12/1992 | Stumpf et al. ............. 395/375 |
| 5,237,694 | 8/1993 | Horne et al. ............... 395/725 |
| 5,265,232 | 11/1993 | Gannon et al. ............ 395/425 |
| 5,289,588 | 2/1994 | Song et al. ................ 395/425 |
| 5,428,761 | 6/1995 | Herlihy et al. ............. 395/427 |
| 5,524,255 | 6/1996 | Beard et al. ............... 395/800 |
| 5,553,267 | 9/1996 | Herlihy et al. ............. 395/474 |

OTHER PUBLICATIONS

P. Heidelberger et al., "Improved Compare–and–Swap Instruction . . . ", IBM Tech. Disc. Bulletin, Mar. 1992, pp.:177–119.

M. Herlihy et al., "Transactional Memory Support for Lock–Free Data Structures," DEC, Dec. 1, 1992, pp.:1–40.

P. Sweazy et al., "A Class of Compatible Cache Consistency . . . ", Proc. of 13th Annual Symposium on Comp. Architecture, Jun. 1986, pp.:414–423.

(List continued on next page.)

*Primary Examiner*—Larry D. Donaghue
*Assistant Examiner*—Walter D. Davis
*Attorney, Agent, or Firm*—Louis J. Percello

[57] ABSTRACT

Using this invention, more than one variable that is shared in a multiprocessing environment can be updated atomically. Each computer processor operating in the multiprocessing environment contains more than one reservation register which, along with this novel method, are used to place reservations on each of more than one shared variable. During the execution of a program, a plurality of shared variables can be reserved, each by its respective reservation register. A reservation is placed on a shared variable by means of a special instruction. The reservation register keeps track of: the address of the shared variable that it is reserving, the value of the modified results that are to be updated in the shared variable address, whether the variable has been updated, whether the reservation is valid, and whether the processor containing the reservation register has a privilege to update the shared variable. A reservation can be invalidated if a second processor tries to read the address of the reserved shared variable. When an instruction is encountered that tries to update a shared variable, the set of reserved modified shared variables designated by that instruction that have unupdated modified results are updated atomically if and only if all the reservations in the designated set are valid. If any of the reservations in the set are invalid, no shared variable in the set is updated. A condition code reports if the update was successful or did not occur. The condition code can be tested so that the sequence of instructions can be repeated until it is successful.

2 Claims, 16 Drawing Sheets

OTHER PUBLICATIONS

Richard Witek et al. "Alpha Architecture Reference Manual" 1992 Digital Press, Digital Equip. Corp.pp.4–8, 4–12.

G. Kane & J. Heinrich "MIPS RISC Architecture" MIPS Computer Systems, Prentice Hall, Englewood Cliffs, NJ.

E.G. Coffman, Jr. et al., "System Deadlocks", Computing Surveys, vol. 3, No. 2, Jun. 1971, pp. 70–78.

H.S. Stone, "Multiprocessors", High–Performance Computer Architecture, Chapter 6, Addison–Wesley Publishing Company, USA, pp. 304–360.

H.S. Stone, "Multiprocessor Algorithms", High–Performance Computer Architecture, Chapter 7 Addison–Wesley Publishing Company, USA, pp. 361–432.

D.B. Lomet et al., IBM Tech. Disc. Bulletin, vol. 22, No. 3 Aug., 1979, pp. 1290–1293.

M. Herlihy et al., "Transactional Memory: Architectual Support for Lock–Free Data Structures," believed to be unpublished.

Reservation Register Structure

Network Message Receiver

Network Message Receiver, Do Invalidate

Network Message Receiver, Grant Privilege

1

POSTING MULTIPLE RESERVATIONS WITH A CONDITIONAL STORE ATOMIC OPERATIONS IN A MULTIPROCESSING ENVIRONMENT

This is a continuation of application Ser. No. 07/993,193, filed Dec. 18, 1992, abandoned.

FIELD OF THE INVENTION

This invention relates to the field of updating shared variables in a multiprocessing computer environment. More specifically, this invention relates to the ability to perform an atomic update of a plurality of shared variables by means of a plurality of reservation registers.

BACKGROUND OF THE INVENTION

Modern multiprocessor computer systems provide a means for two or more processors to access and modify common memory locations. Such locations are said to be shared locations, and each location is said to contain a shared variable.

Another context in which shared variables exist within a computer system is within a single processor in which separate and distinct programs (sometimes called processes) reside concurrently in the single processor. Each process takes control for a period of time called a quantum and at the end of the quantum, is suspended while another process is granted access to the processor. Execution of the processes is such that their respective time quanta are interlaced in time and granted on a round-robin or priority basis. The processes can access and modify common locations, and thus these processes in a single processor logically operate on shared memory locations as if they were executing on separate and distinct processors.

In either case, because two or more concurrent processes can update a shared variable, the potential exists for the update to be done inconsistently. Suppose each of two processes is assigned the task of incrementing a memory location. Each process attempts to do the task by reading from the location to a machine register, incrementing the machine register, and then writing to the new value of the machine register to memory. If Process 1 performs the Read/Modify/Write without intervention from Process 2, and if Process 2 then performs the same operations, the shared variable will be correctly modified by being incremented twice.

An inconsistency arises when the Read/Modify/Write operations of the two processes are interlaced in time. That is, if Process 1 reads the value of a variable X, then Process 2 reads the same value of X, and then the subsequent increments and writes occur in arbitrary order, each process will store the value of X equal to its original value incremented once. Thus the final value of X will reflect only a single increment. One increment will be lost.

The reason for obtaining an incorrect final value is that the two processes operate on inconsistent data. If Process 1 reads the value of X with intent to modify it, then the logical residence of X has shifted from shared memory to the private register associated with Process 1. If subsequently Process 2 reads X, and X has not yet been modified by Process 1, the value read by Process 2 is inconsistent with the actual value of X, because X is currently not accessible in the shared memory, and will not be accessible again until it is rewritten.

To assure correctness, it is necessary to assure consistency. A sufficient condition for consistent behavior is to assure that when a Read/Modify/Write sequence of operations is performed on a shared variable X, the sequence is performed atomically. By atomically we mean that the sequence is performed without permitting any other process to change the value of X between the time the Read X is done and the Write X is done.

There are many ways to assure correctness and consistency of Read/Modify/Write sequences of actions. One way is to enclose such sequences in a region of a program called a critical section. A critical section is preceded by one or more instructions that perform a locking operation, and succeeded by one or more instructions that perform an unlocking operation. The lock and unlock operations assure that at most one process can execute code within the critical section at any one time. If by convention or protocol, all other processes update the same shared variables by means of critical sections controlled by the same lock and unlock mechanism, then the Read/Modify/Write operations within the critical section can update shared variables atomically, because no other process can perform an intervening access to the shared variables while one process is in the act of performing a Read/Modify/Write process in the critical section.

To create a critical section, it is necessary to have a lock function. Within prior art, a common means for implementing such a function is by means of an instruction that itself performs an atomic Read/Modify/Write on a lock variable. Among the instructions used for this purpose are the Test-and-Set instruction and the Increment (or Decrement) instruction.

The Test-and-Set instruction reads a variable X, sets a bit of X to the value 1 regardless of the original state of the bit, rewrites X, and returns a condition code whose value is equal to the original bit before it was forced to be the value 1. Because this instruction performs a Read/Modify/Write of a shared variable, it must be implemented to perform such an update atomically in order to assure consistency of execution. This one instruction can be used to set a lock that guards a critical section in which a Read/Modify/Write sequence of arbitrary complexity can be executed consistently, since the lock prevents intervening accesses to the shared variables by other processes.

To use the Test-and-Set instruction to create a lock, each process protects the critical section with a Test-and-Set instruction that accesses a lock variable. Immediately after the execution of the Test-and-Set instruction, the lock variable will hold the value 1, regardless of its former value. Each process tests the condition code after executing Test-and-Set, and only the process that observes a code of 0 (corresponding to an initial value of 0) can enter the critical section and execute the Read/Modify/Write sequence within the critical section. All other processes attempting to execute the Read/Modify/Write code in their respective critical sections must wait or do something else until the lock for the critical section is in the unlocked (0) state. When a process completes the Read/Modify/Write sequence and leaves the critical section, it clears the lock by storing a 0 in the lock, thereby permitting another process to enter the critical section by executing a Test-and-Set on the lock with an initial value of the variable equal to 0.

Test-and-Set is found on the IBM 370. Increment and decrement can be implemented as atomic Read/Modify/Write operations, and can be used to do essentially what the Test-and-Set does, almost as a direct replacement for Test-and-Set. They are more versatile because they can increment and decrement shared variables atomically, while Test-and- Set can only set a bit. The DEC VAX has atomic increment and decrement instructions.

There are several problems with using Read/Modify/Write operations to create a critical section. Among these are:

1. A critical section allows at most one process to enter at a time. If a process enters the critical section and fails, the entire system fails because no other process can enter the critical section.
2. A lengthy and complex critical section is a performance bottleneck in a multiprocessor system. Since only one process at a time can enter a critical section, if other processes must enter the same critical section, they must wait until it is available, and they may be forced to be idle during this time. A desirable solution to this problem is to update the shared variables by means of sequences of instructions that perform Read/Modify/Write outside any critical section. This modification has to be carefully controlled so that consistency is maintained.
3. Since a critical section contains many instructions, a time quantum for a process can end within a critical section, and that process can be suspended for a lengthy period of time while other processes take control of the processor. During the period of suspension of the process that holds the lock for the critical section, no other process can enter the critical section and update the shared variables controlled by that critical section.

To overcome these disadvantages, it is possible to implement complex operations on shared variables as a single instruction performed atomically. As an example, the DEC VAX has atomic ENQUEUE and DEQUEUE instructions each of which changes up to four shared variables concurrently and atomically, and thus makes changes consistently.

If this approach is followed, the machine designer has to supply an atomic instruction for each distinct operation on shared variables for each data representation. For example, the DEC VAX has different ENQUEUE and DEQUEUE instructions for queues with different representations. Queues with one pointer per element must be manipulated by one of the ENQUEUE/DEQUEUE pairs of instructions, and queues with two pointers per element must be manipulated by a different pair of ENQUEUE/DEQUEUE instructions.

The problem with this approach is that the machine designer must anticipate every conceivable atomic operation and every conceivable data representation, because each such operation is extremely specialized. This approach fails because the programmer cannot easily create and use a custom-made atomic operation for each particular context and data representation.

Therefore, an important problem to address is the ability to produce customized atomic operations for complex updates to shared variables, and to perform these atomic operations so that the actual update takes place during the execution of a single instruction. In this way, the reliability and performance of the multiprocessor system are not at risk due to failures or interruptions of a process that holds a lock for a critical section.

A partial solution to this problem is available through the use of the Compare-and-Swap instruction as implemented on the IBM 370. The Compare-and-Swap instruction provides the last step of a Read/Modify/Write sequence of instructions that is not protected by a critical section, and performs the Write operation only under certain conditions that are suppose to assure consistency and atomicity. To use the Compare-and-Swap, a process first performs by means of conventional nonatomic instructions all of the actions of a Read/Modify/Write sequence for updating a shared variable except for the final Write of the updated value of the shared variable. To perform the final Write action, the process uses the Compare-and-Swap instruction. The Compare-and-Swap rereads the variable from storage and compares the current value in storage to a copy of the prior value that is held in a machine register. If the two values are identical, the Compare-and-Swap updates the variable in storage with the newly computed value. If the copy of the prior value held in a machine register and the current value held in shared memory differ, the Compare-and-Swap does not update storage, and replaces the copy of the prior value held in the machine register with a copy of the current value of the variable in shared memory. The instruction reports what happened in a condition code. Since the Compare-and-Swap itself performs a Read/Modify/Write sequence of actions, those actions must be done atomically to assure program correctness.

The idea of the Compare-and-Swap is that a shared value can be updated if no other process has altered the value since it was last read. This is supposed to assure consistent behavior. Unfortunately, there is a possibility of an inconsistent update. While a first process is in the midst of performing a Read/Modify/Write sequence terminated by a Compare-and-Swap, it is possible for a second process, executing concurrently, to read the value of the variable (say value A), to change the value to a new value (say value B), and for yet another process to return the shared variable to the prior value (value A) while the first process is computing a new value based on value A. When the first process reaches the Compare-and-Swap instruction, the Compare-and-Swap will succeed because the current value and the prior value are both equal to A.

However, for many applications, correctness requires not only that prior and current values of the shared variable be equal, but that the variable in storage maintained the value A continuously between the time it was first read during the execution of the Read/Modify/Write sequence and the time the Compare-and-Swap was executed. The failure of the Compare-and-Swap to detect such a change of values is called the ABA problem.

Most algorithms for concurrent access and modification of shared variables may fail if the ABA problem can occur. There are various software schemes used in conjunction with Compare-and-Swap to eliminate or reduce the probability of a failure due to the ABA problem.

Another approach to the problem is very similar to the use of Compare-and-Swap, except that it detects whether or not a variable has maintained a value continuously at the time an update is attempted. In essence, the scheme works as if the Compare-and-Swap tests a variable for whether it has changed or not instead of testing for equality of current and prior values. The scheme uses a notion called a reservation.

The scheme uses two instructions, Load-with-Reservation and Write-if-Reserved, although the instructions have different names on the various processors that use it. It is in current use on the MIPS R-4000 processor [Kane, 1989], and on the DEC ALPHA processor [Digital Equipment Corporation, 1992]. The Load-with-Reservation reads a shared variable from storage and at the same time places the address of that variable in a special register known as a reservation register. The reservation register monitors changes to the variable made by other processes, and those other processes can be those executing on the same processor or on other processors. If any other process changes the value of the variable, the reservation disappears. Otherwise it remains present until the process that placed the reservation reaches the Write-if-Reserved instruction. The Write-if-Reserved instruction performs the update only if the reservation is still present. If not, the Write-if-Reserved performs no update. In either case, the instruction returns a condition code indicating what happened. For many applications, the process then tests the condition code and repeats the Load-with-Reservation, modify, Write-if-Reserved sequence until the update succeeds.

Statement of the Problems with the Prior Art

The notion of reservation solves most of the problems posed above for the case of the updating of a single variable. However, most processes that operate on shared data structures must operate on two or more shared variables atomically. That is, when an update to the data structure occurs, the changes to two or more variables associated with that change must be done so that the change is made as if all changes occurred simultaneously. No other process can make an intervening access to these shared data while the update is being performed. A single reservation is not sufficient to implement such operations. Typical data structures that require complex updates involving two or more variables are queues, priority lists, and data bases.

The solution that we seek must contain all of the following components:

1. A single instruction that updates all variables to be updated.
2. A means for executing that single instruction so that the updates are performed with no intervening access permitted by a different process. (Required for atomicity of the update.)
3. A means for reserving two or more shared variables.
4. A means for detecting changes to reserved variables made by other processes.
5. A means for performing the atomic update of the shared variables that depends on the current presence of the reservations placed by the process.

The prior art contains no solution that addresses all of these factors. Critical sections suffer from reliability and performance problems because they require multiple instructions to perform an update. The various single-instruction Read/Modify/Write instructions are able to perform very specific updates in a single cycle, and are unable to perform more complex updates. The Compare-and-Swap instruction provides capabilities for updating one or two shared variables, but fails to detect the presence of the ABA problem because it does not assure that a value has been held continuously. The use of a single reservation is suitable only for the update of a single variable, and fails to provide the facilities needed to update complex shared data structures.

Accordingly, there has been a long-felt need in this area for a method and apparatus that can update a complex shared data structure atomically. Such a mechanism requires all of the components listed above. This would allow programs to create customized Read/Modify/Write processes that have all of the advantages of complex atomic operations such as Enqueue/Dequeue that exist for specific data structures.

References

Coffman, E. G., Jr.; M. J. Elphick, and A. Shoshani, "System deadlocks," *Computing Surveys*, Vol. 3, No. 1, pp. 67–78, 1971.

Digital Equipment Corporation, *Alpha system reference manual* 1992.

Kane, G., *MIPS RISC Architecture*, Prentice Hall, 1992.

Stone, H. S., *High Performance Computer Architecture*, Second Edition, Reading MA: Addison-Wesley, 1990.

Sweazy, P. and A. J. Smith, "A class of compatible cache-consistency protocols and their support by the IEEE Futurebus," *Proceedings of the 13th Annual International Symposium on Computer Architecture*, Tokyo Japan, pp. 414–423, June, 1986.

OBJECTS OF THE INVENTION

An object of this invention is an improved method of using reservations to atomically update variables shared by multiple programs or processors.

Another object of this invention is an improved method and apparatus of using multiple reservations to atomically update a group of variables shared by multiple programs or processors.

Another object of this invention is a method and apparatus that permits an efficient modification of a single-process algorithm so that it can run in a multiprocessor and/or multiprogram environment on a single processor.

Another object of this invention is to make as much use as possible of protocols and hardware that would otherwise be present within a multiprocessor so that the facilities provided by this invention can be added to existing art with minimum cost and design effort.

SUMMARY OF THE INVENTION

This invention is an efficient, accurate method for using two or more reservations to update a group of shared variables atomically. The invention can use a plurality of reservation registers to atomically update a plurality of shared variables. The group of shared variables are all updated together or none are updated at all.

The invention requires an arbitrary number, N, of reservation registers, typically labeled 0 through N–1, and a novel method that includes placing reservations on a plurality of shared-memory locations. Before any of the shared-memory locations are updated with current information, their reservation status is checked. If the reservations of all locations specified by an instruction are valid as determined by certain reservation status information, all the shared-memory locations values that have been modified are updated atomically. If the validity status memory for one or more of the reserved shared variables is in the invalid state, no update is done on any shared memory location. The result of an attempted update is reported in a condition code whose value signifies whether the update was done or not. A process can test the condition code, and attempt to perform the atomic update of the shared variables again if the attempt failed.

The method makes use of three instructions: Load-with-Reservation (LR), Store Contingent (SC), and Write-if-Reserved (WR). When a process executes an atomic modification of one or more shared-memory locations, it performs a sequence of steps that read the shared-memory locations, modify their contents, and then write back the new values atomically. The process begins this atomic update by reading each of the shared-memory locations with a Load-with-Reservation instruction. The effect of this instruction is to copy the shared-memory locations to registers in the processor that is executing the update process, and to place reservations for those variables within the same processor. In the preferred embodiment, this reservation is represented by an address stored within a reservation register designated by the Load-with-Reservation instruction. The Load-with-Reservation instruction also initializes certain status fields within the same reservation register.

At this point, any general-purpose operations may be performed on the copies of the shared variables retrieved from the shared memory. For example, individual variables may be incremented, decremented, and shifted, and shared variables may be combined by addition or multiplication, or new values may be obtained by using shared variables as indirect pointers to other shared variables. The operations modify one or more of the local copies of the shared variables. The Store Contingent instruction is then used to store the modified result in a temporary memory. In the preferred embodiment, this temporary memory location is also a field of the reservation register associated with the shared variable memory location. The Store Contingent instruction also updates certain reservation status fields to indicate that there are modified results to be written back to the shared-variable memory location. As the processes continue to execute instructions, whether on a multiprogrammed uniprocessor or on a multiprocessor, a plurality of shared variables may be accessed and modified in this way.

At some point, one or more of these modified results must be written back to its respective shared variable memory location. These updates are performed by the Write-if-Reserved instruction. The Write-if-Reserved instruction checks to confirm that the reservations held in specified registers remain valid, and if so, it updates those shared variables whose reservation status registers show that the local copy of that variable has been modified. The modifications of the shared variables are done atomically so that all modifications are made or none are made, and if all are made, no other process can intervene with a write to any of the shared-memory locations. All reservations specified by the Write-if-Reserved instruction are left in the invalid state at the close of execution of the Write-if-Reserved instruction, and the Write-if-Reserved instruction reports through a condition code whether or not the atomic update was completed successfully.

DETAILED DESCRIPTION OF THE INVENTION

Figure 1:
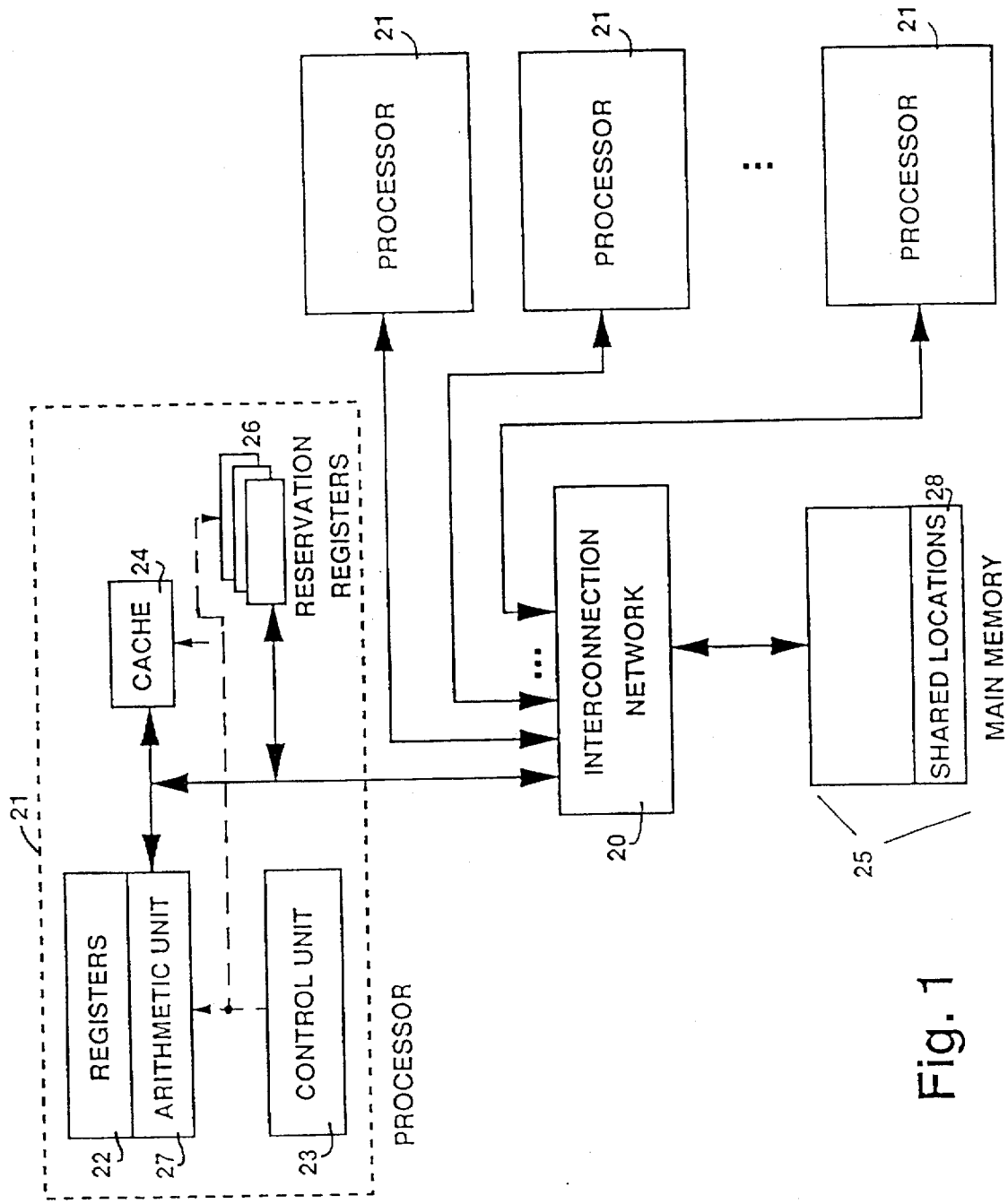
FIG. 1 is a block diagram of a computer apparatus of the present invention having more than one reservation register.

The overall system that would make use of the invention is shown in FIG. 1. The figure shows a multiprocessor system consisting of a plurality of processors (blocks 21) connected together through an interconnection network (block 20) through which control and data can be interchanged. The interconnection network can be as simple as a bus or as complex as a crossbar or multistage interconnection network as described, for example, in Chapter 6 of Stone [1990]. Also connected to the interconnection network is a commonly known global shared memory, block 25. In a parallel processing environment, main memory 25 has one or more shared memory locations 28 that contain shared variables used by one or more of the parallel processes and/or processors 21. Copies of shared memory locations 28 can exist on the processors 21, e.g., in cache 24.

Each processor is composed of the blocks shown within block 21 of FIG. 1. They contain registers (block 22), an arithmetic unit (block 27), a control unit (block 23), a cache (block 24), and a plurality of reservation registers (blocks 26). Typically, the processor registers, block 22, has a plurality of registers. In the prior art, a system contains all components shown in FIG. 1, except that no prior art machine known to the inventors has more than one reservation register. An example of a machine with one reservation register is the MIPS R-4000 [Kane, 1989].

Figure 2:
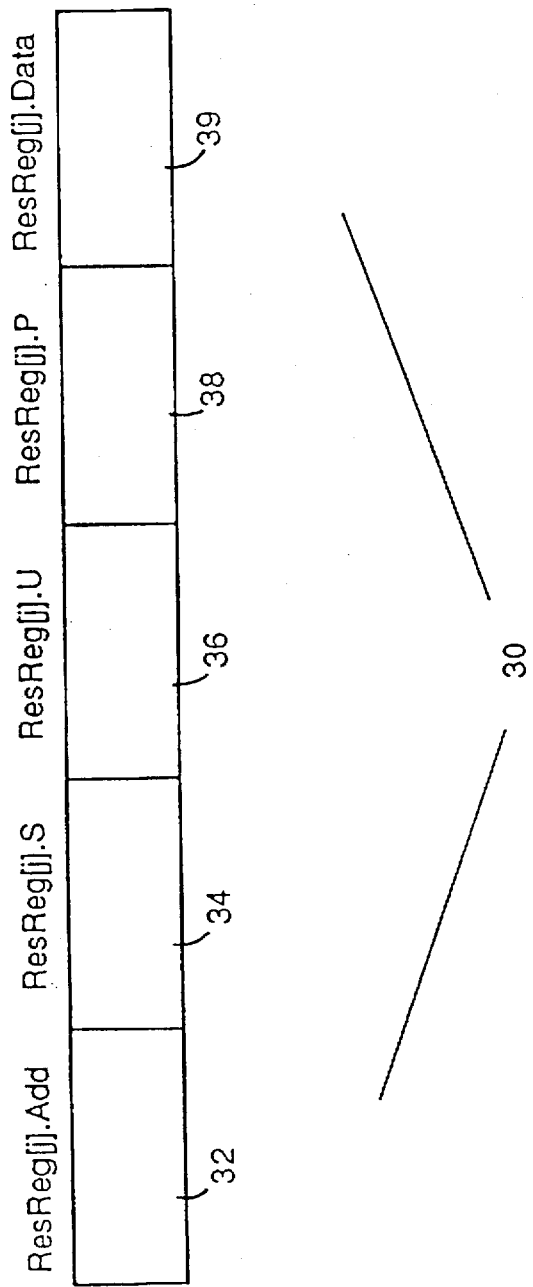
FIG. 2 shows a reservation register apparatus of the preferred embodiment.

Block 26 represents a bank of more than one reservation register. A preferred reservation register 30 used by the present invention is shown in FIG. 2. Each preferred reservation register 30, ResReg[j], of the N number of a plurality of registration registers 26, comprises at least 5 fields including: ResReg[j].Add 32, ResReg[j].S 34, ResReg[j].U 36, ResReg[j].P 38, and ResReg[j].Data 39. (The index, j, in each field keeps track of which reservation register contains the field). The ResReg[j].Add 32 field stores the address of a shared memory location that is reserved by a Load-with-Reservation instruction. The field length of this field is determined by the size of the largest address of a shared memory location that could require a reservation. This temporary address storage location, ResReg[j].Add 32, is located in the reservation register 30 in the preferred embodiment. However, in alternative embodiments this information could be temporarily stored in a cache memory or in other buffers within the local processor. The ResReg [j].S 34 field is typically a 1-bit status flag that indicates whether or not the reservation register 30 holds a reservation. In other words, the flag indicates whether the reservation for a variable in the shared memory location 28 whose address appears in reservation register 30 remains valid or alternatively whether the reservation has been invalidated by the action of a remote processor or process. The shared memory location 28 is associated with the register when the location 28 address is stored in the reservation register 30 ResReg[j].Add 32 field.

In similar fashion, the ResReg[j].U field is typically a 1-bit status flag that indicates whether there are modified results that are to update the shared memory location 28 that is associated with the reservation register 30. The ResReg [j].P field is a status field that indicates whether or not the location has write privilege. A processor must have write privilege for a variable before it can update that variable. A processor must have write privilege for all shared variables designated by a Write-if-Reserved instruction before the atomic update of shared variables designated by that Write-if-Reserved instruction can begin. This is described in more detail later in the FIG. 8 description.

The ResReg[j].Data 39 field is used in the preferred embodiment to store modified results that are to be written back to the shared memory location. In the preferred embodiment the modified results are held temporarily in the reservation registers, but in other embodiments those results can be held in any other convenient temporary storage locations such as cache memory and high-speed buffers.

The present invention is a novel computer apparatus having more than one reservation register and a method that makes effective use of this plurality of reservation registers to update shared variables in a multiprocessing environment. The updates are made atomically in the sense that all modifications of an atomic set are performed or none are performed. Moreover, when a collection of modifications is performed atomically, no other processor can perform intervening writes to the reserved locations in the set. In other words, the updates are made so that all changes to shared variables become visible to all other processors as if the changes happened simultaneously. The preferred embodiment of this invention shows how to implement such updates with reservation registers so that all changes occur or none occur whenever an attempt to update reserved shared variables by means of a Write-if-Reserved instruction occurs.

Figure 3:
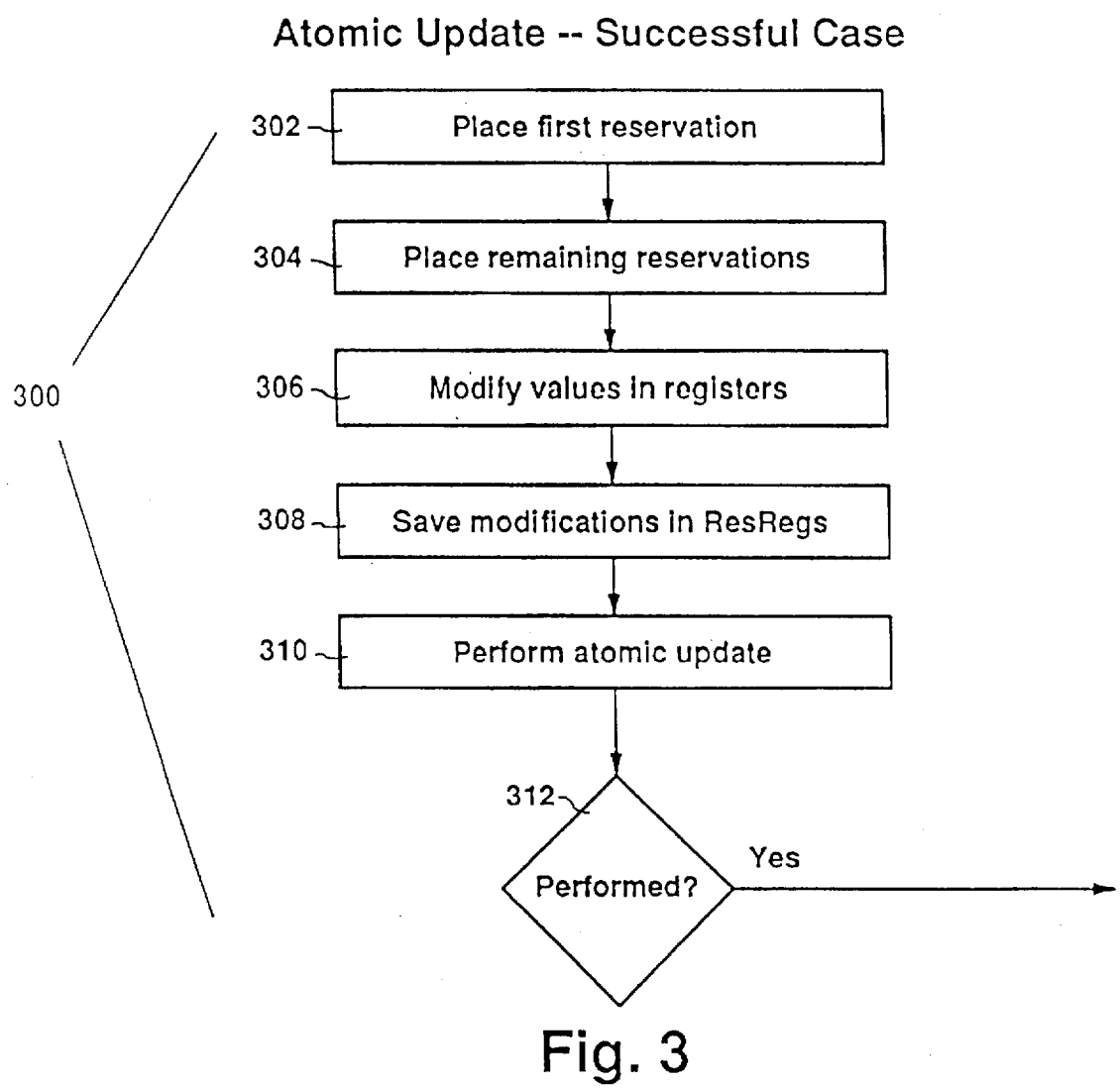
FIG. 3 is a flowchart showing the general method of this invention for successfully atomically updating more than one shared memory location with modified data.

FIG. 3 shows the overall method of the present invention. The preferred method uses three instructions that are described as follows:

1. Load-with-Reservation (LR): This instruction places a reservation in a specified reservation register associated with a given memory address.
2. Store Contingent (SC): This instruction places a modified result value in a field of a reservation register associated with a shared memory location in preparation for an atomic update.
3. Write-if-Reserved (WR): This instruction performs the atomic update of share memory locations whose addresses are held in reservation registers with valid contents, that have been updated by a Store Contingent instruction after placing the reservation. The atomic update occurs provided that all reservations are valid and write privilege has been obtained successfully for all reservations. If these conditions are not satisfied, the reservations are removed, and no variables are changed.

The method 300 starts when a process accesses the first shared-memory location with a Load-with-Reservation instruction as shown in block 302. The precise details of how a reservation is placed are described more fully later.

Block 304 shows additional Load-with-Reservation instructions reservations being placed on as many shared-memory variables as the atomic update depends, up to the number of reservation registers in the local processor.

Block 306 shows the execution of the computations that produce updated values of shared variables in machine registers. These variables are saved in the reservation registers in block 308 by means of the Store Contingent instruction. The updated variables are possibly all of the reserved variables, or possibly a subset of the reserved variables. Every updated variable must be reserved. In addition, other shared variables must be reserved even if they are not updated if the consistency of the atomic update requires that the update use the most current values of such variables. A Load-with-Reservation is required for each shared variable on which an update depends and for the variables that are updated during the atomic operation. For example, these shared variables might include the inputs and outputs of a procedure.

In block 310, the atomic update is performed by means of the execution of a single Write-if-Reserved instruction. The update is performed in this instance because no remote processor has written to a reserved shared variable, and thereby all reservations are valid when block 310 is reached.

In block 312, the process tests the condition code returned by the Write-if-Reserved instruction and learns that the update has been done. In this case the flow chart takes the success exit.

Figure 4:
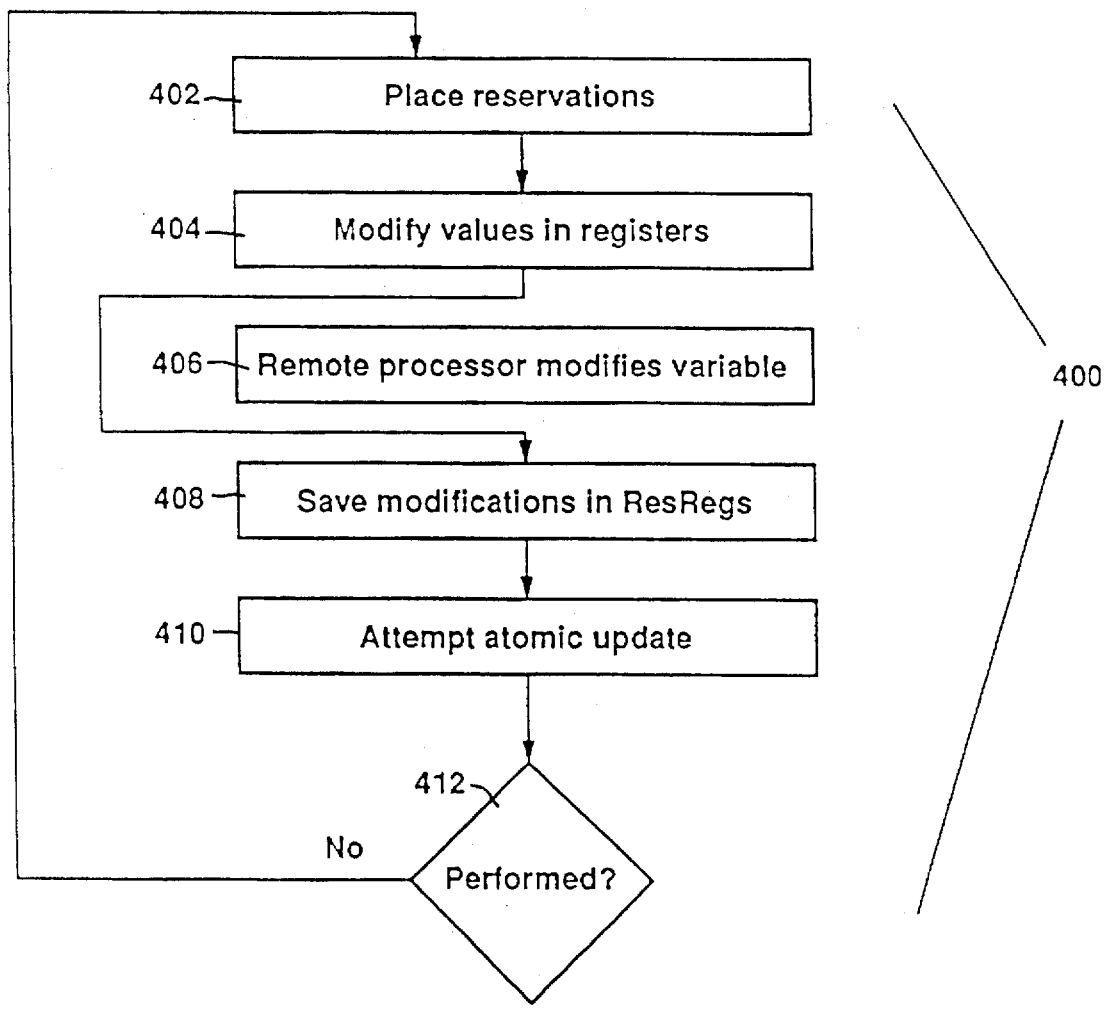
FIG. 4 is a flowchart showing the general method of this invention for executing an unsuccessful attempt to atomically update more than one shared memory location with modified data.

FIG. 4 is very similar to FIG. 3 except in this case a remote processor or process modifies (writes to) a reserved shared variable, and invalidates a reservation. Process 400 of FIG. 4 begins at block 402 in which all reservations are placed. Block 404 shows the computation of the updated values of the variables. Block 406 shows the modification (writing) of a shared variable by a remote processor or process, and the invalidation of the reservation for that variable in the local processor. Block 408 shows the processor storing all updated values in reservation registers by means of Store Contingent instructions, and block 410 shows the attempt to execute a Write-if-Reserved instruction. Nothing is updated because of the invalid reservation that occurred in block 406. Block 412 shows the process testing the condition code of the Write-if-Reserved and taking the failure exit to repeat this atomic update at block 402. In an alternative embodiment, a remote processor or process will invalidate a reservation of a shared variable by performing any access to shared variable, whether the access modifies the shared variable, as is the case here, or not.

Figure 5:
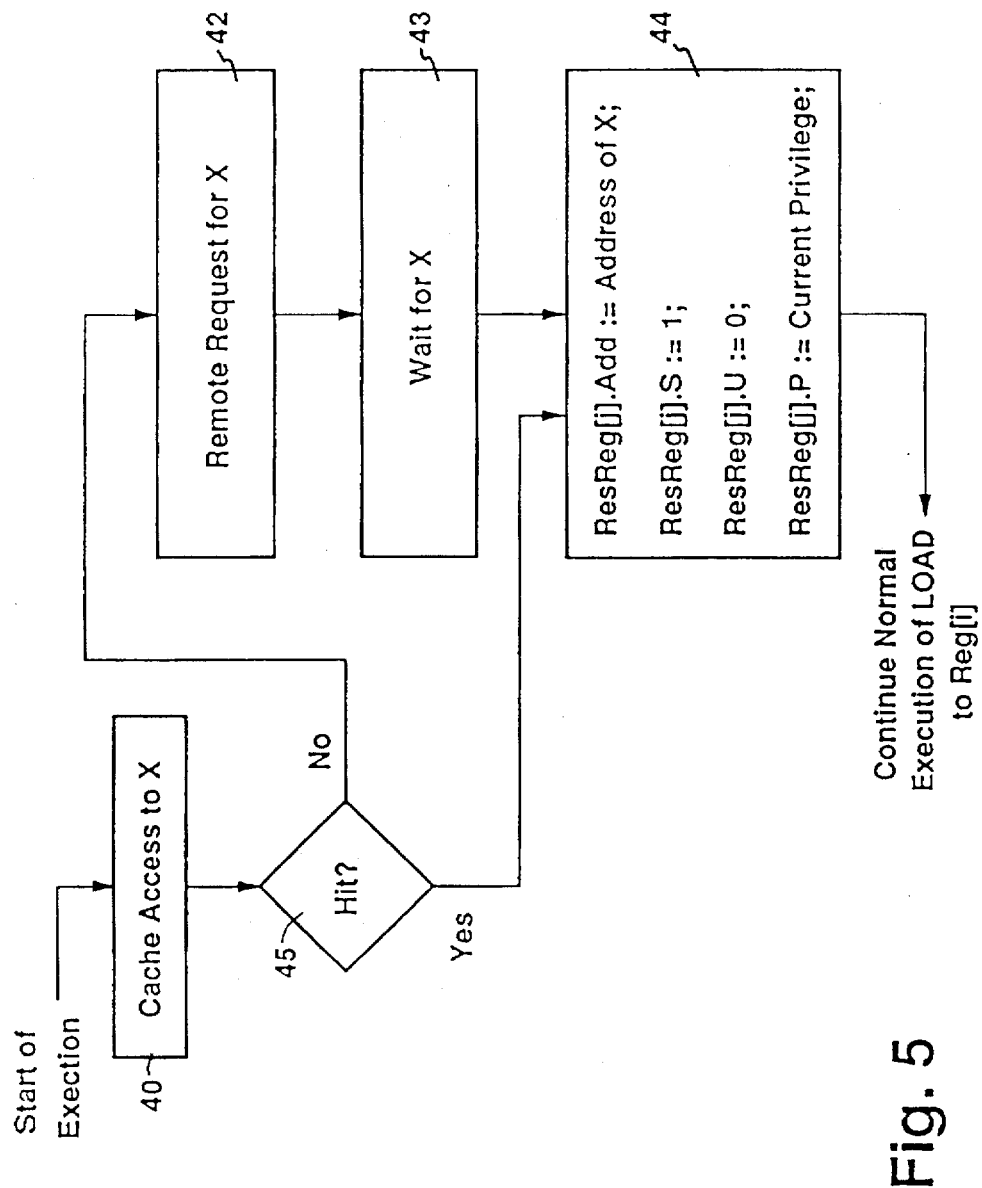
FIG. 5 is a flowchart showing the steps of performing a Load-with-Reservation instruction in the preferred embodiment.

FIG. 5 shows the preferred embodiment of the Load-with-Reservation instruction. In the preferred embodiment, the Load-with-Reservation specifies a reservation register 26, denoted ResReg[j] 26, a memory location X, and processor register Reg[i] 22.

To place a reservation for X in ResReg[j], the figure shows the process beginning with a cache access (block 40) that tests to see whether there is a copy of X in the cache. In this embodiment, the process first checks to see if a copy of the shared variable is in the local cache memory. If the item is not in cache, as indicated by the "No" exit to the "Hit?" conditional test in block 45, the processor places a request for the value of X at the interconnection interface, block 20 of FIG. 1. The processor waits for the value of X in block 43 of FIG. 5, and when it arrives, the processor places a reservation for the address of X in ResReg[j].Add as shown in block 44. The act of placing a reservation for X requires that the address be stored in ResReg[j].Add, that the S bit (State bit) be set to 1 to indicate that the register holds a reservation, that the U bit (Update bit) be set to 0 to indicate that the value has not been updated, and that the P bit (Privilege bit) be set to the current write privilege that the processor holds for X. If the processor holds write privilege, the P bit is set to 1. If not, the P bit is set to 0. The write privilege is normally stored in the cache entry for X, and is available to the local processor after the cache access in block 40. If X is not present in the cache, the processor normally does not receive write privilege when it receives X after waiting at block 43, although it is possible to give write privilege at this point if the system is able to determine that X is not held in any other cache.

To maintain cache coherence, the system must be constructed so that for any location X at most one processor has write privilege for X at any given time. It is a practice in prior art to build systems that maintain cache coherence by means of write privilege as described by Sweazy and Smith [1986].

Block 44 of FIG. 5 shows the novel addition of a U bit (for update) and a P bit (for write privilege) that are used in the preferred embodiment of the invention. These reservation parameters enable the atomic updating of more than one shared variable in a multiprocessing environment because they indicate which reservations do not have write privilege and must obtain it before an atomic update can initiate, and they indicate which reserved variables have actually been modified and therefore need to be rewritten to shared memory during an atomic update.

Figure 6:
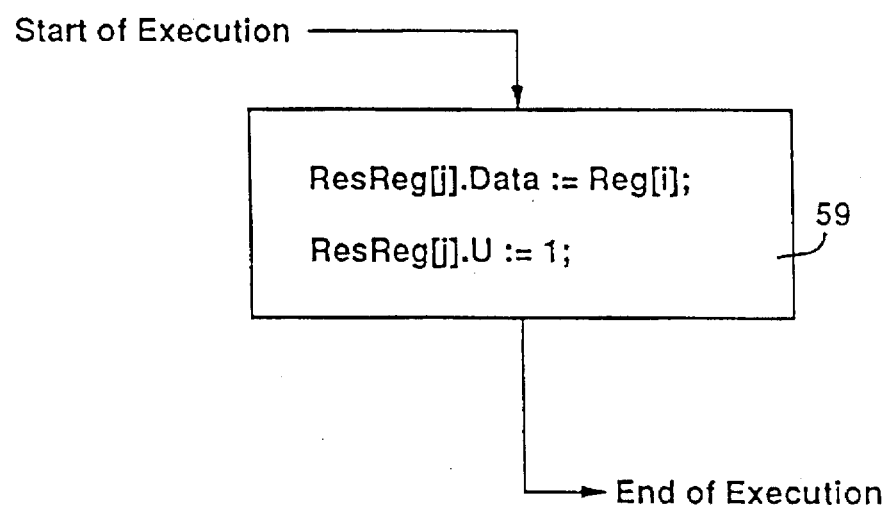
FIG. 6 is a flowchart showing the steps of performing a Store Contingent instruction.

FIG. 6 describes the action of a Store Contingent. This instruction places the newly modified value of a shared variable in ResReg[j].Data in preparation for the atomic update of all modified variables. The instruction marks the reservation as updated by setting the U bit 36 to 1. The actions take place in Block 59. The modified results will eventually be placed into the shared memory location whose address is saved in the same reservation register in the Add field 32. The action of copying the modified results From the reservation register to shared memory takes place during a successful atomic update. Otherwise, the modified data will be discarded when the Write-if-Reserved instruction fails during the attempt to make an atomic update.

Figure 7:
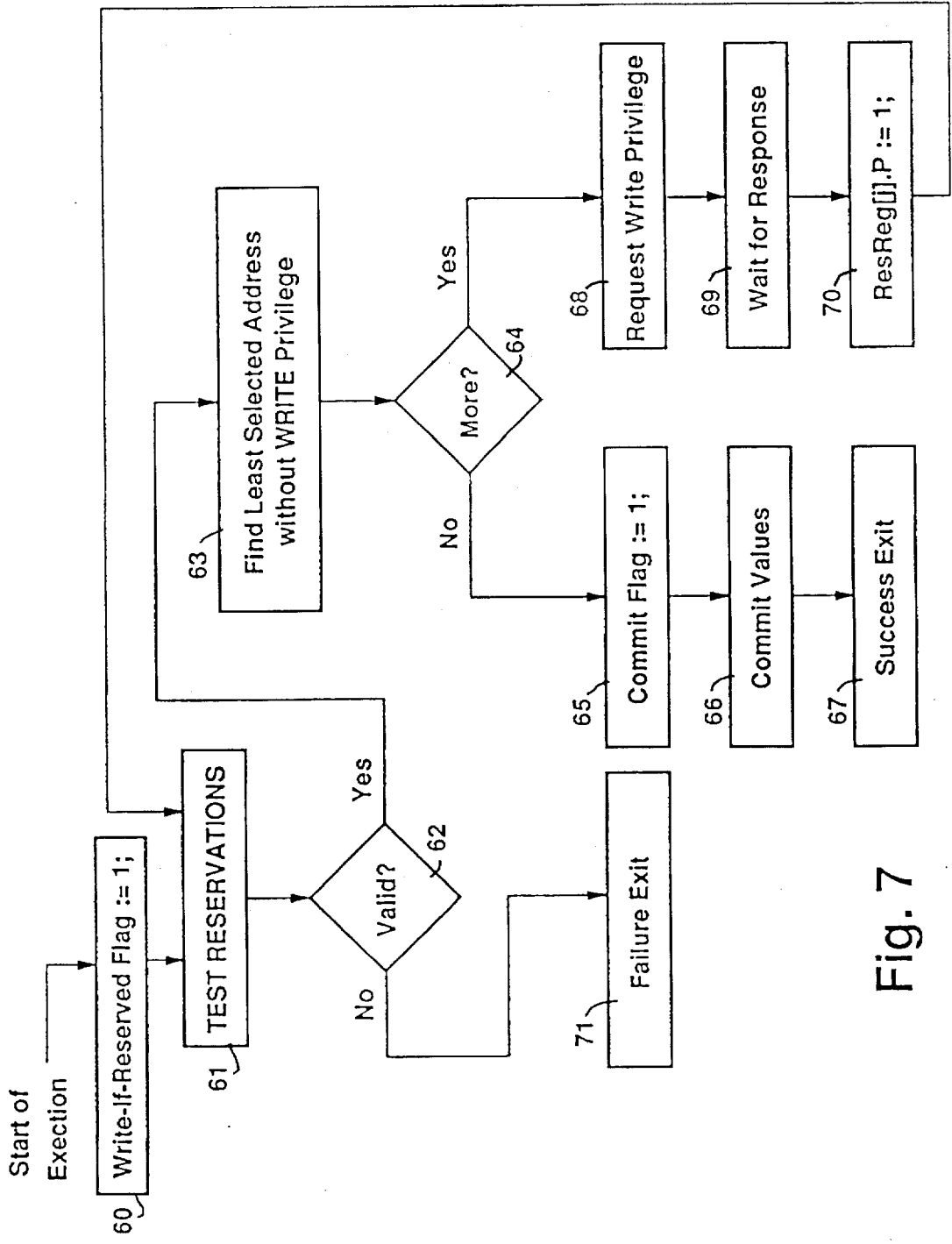
FIG. 7 is a flowchart showing the steps of performing the Write-if-Reserved instruction.

The overall structure of Write-if-Reserved is shown in FIG. 7. Later discussion amplifies the explanation of particular blocks in the figure. A Write-if-Reserved instruction designates a set of reservation registers described below in the FIG. 8 description. If all of these reservations are valid at the point of execution of the Write-if-Reserved instruction, and if one or more have newly modified values to be saved in the reserved shared variables, the Write-if-Reserved instruction attempts to write the values of all the variables atomically, or will write none of them if an atomic update cannot occur.

In order to perform an atomic update, the write of all updated variables has to be based on the current values of all selected reserved variables. To assure that the selected reservations contain current values, it is necessary to obtain write privilege for the selected reserved variables. If any of these variables has changed value since the reservation has been placed, or if the value of any reservation changes before a write privilege has been obtained for all reservations, the Write-if-Reserved instruction takes a failure exit, and no variables are changed.

If the instruction succeeds in obtaining write privilege for all selected reserved variables, and if all selected reservations remain .valid at this point, the Write-if-Reserved instruction enters a Commit phase during which all updated variables are updated as if they were updated simultaneously. That is, if any processor sees the updated value of one of the shared variables after this point, it must not also see the unupdated value of all of the others. The scheme for controlling the atomic update and the holding of reservations makes use of cache-coherence protocol messages that must be present in a system that has no reservation registers. Such systems are described by Sweazy and Smith [1986]. Thus, multiple reservations can be implemented within a cache-coherent multiprocessor system by introducing a relatively small additional complexity to what must already be within the system.

In block 60 of FIG. 7, the Write-if-Reserved Flag is set to 1 as an indication that this instruction has begun. Some cache coherence messages received by the processor during this period will be deferred until the Flag returns to the 0 state. The testing of the flag is discussed later. In the preferred embodiment, the Write-if-Reserved Flag is located in the control unit 23 shown in FIG. 1.

The TEST RESERVATIONS logic in block 61 verifies that the S bit of all selected reservations is 1, signifying that all reservations remain valid. If a remote processor writes a new value to a reserved variable, that action will be communicated to this processor through a cache coherence message, and the action will invalidate the reservation by changing the S bit to 0. This is described in detail later. If all reservations are valid, as tested in block 62, the instruction attempts to obtain privilege for another reserved shared variable before retesting validity again. Privilege is obtained through the execution of block 63 to find a candidate reservation. This is explained in the FIG. 9 description below. Then block 64 tests to see if any candidates remain. If so, privilege is requested in block 68, and the instruction waits for a response in block 69. When the response arrives, the P bit of the selected register is updated in block 70, and the loop repeats beginning within a retest of the selected reservations at block 61. While the loop is traversed, a message from a remote processor can arrive and invalidate a selected reservation. Therefore, the selected reservations are tested repeatedly at block 61.

When all privileges have been obtained, the instruction enters the Commit phase starting at block 65 by setting a flag to indicate that Commit processing is ongoing, and at block 66 to perform the Commit processing.

Block 67 contains the housekeeping required for a successful Commit, and block 68 contains analogous housekeeping operations required for an unsuccessful execution of the instruction. Details appear later in the discussion.

Figure 8:
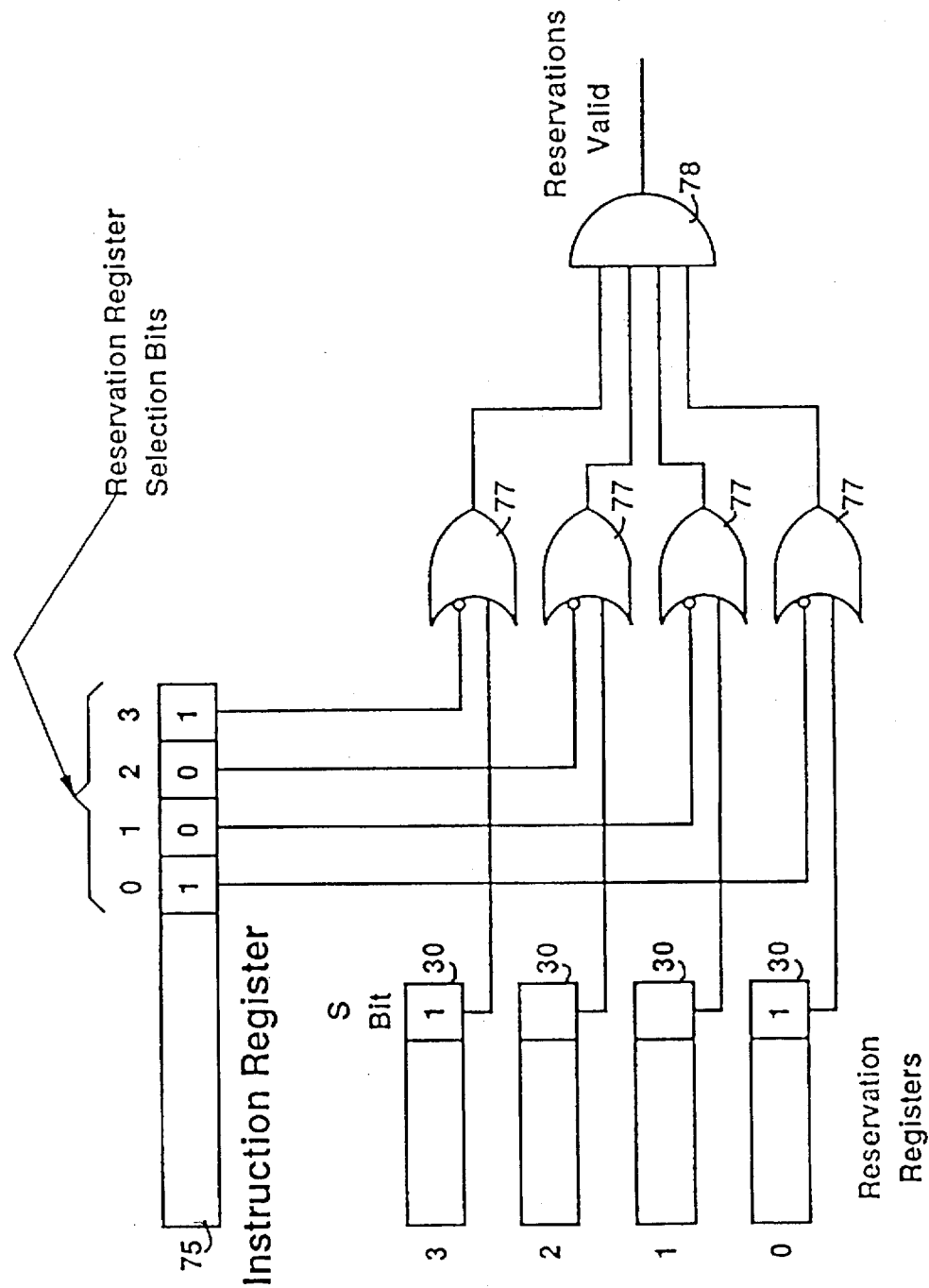
FIG. 8 is a block diagram showing logic apparatus to test the reservation status of more than one shared memory location.

FIG. 8 shows the hardware logic required to test reservations. (See block 61 in FIG. 7.) Bits in the instruction register, block 75, specify which reservations take part in the Write-if-Reserved instruction. In this example, the 1s in bit positions 0 and 3 signify that ResReg[0] and ResReg[3] participate.

The reservation registers, blocks 30, are shown in FIG. 8 with their S bits indicated. The two registers specified by the instruction, ResReg[0] and ResReg[3] in this example, have their S bits set to 1, thereby indicating that their reservations remain valid. Block 77 forms the logical OR of the complement of the selection bit with the true value of the S bit. Its output is a logical 1 if the register is not selected or if the S bit is 1. If all OR gates have 1s on their outputs, the AND gate (block 78) produces a 1 output, and otherwise produces a 0. This output is tested in block 62 of FIG. 7.

Figure 9:
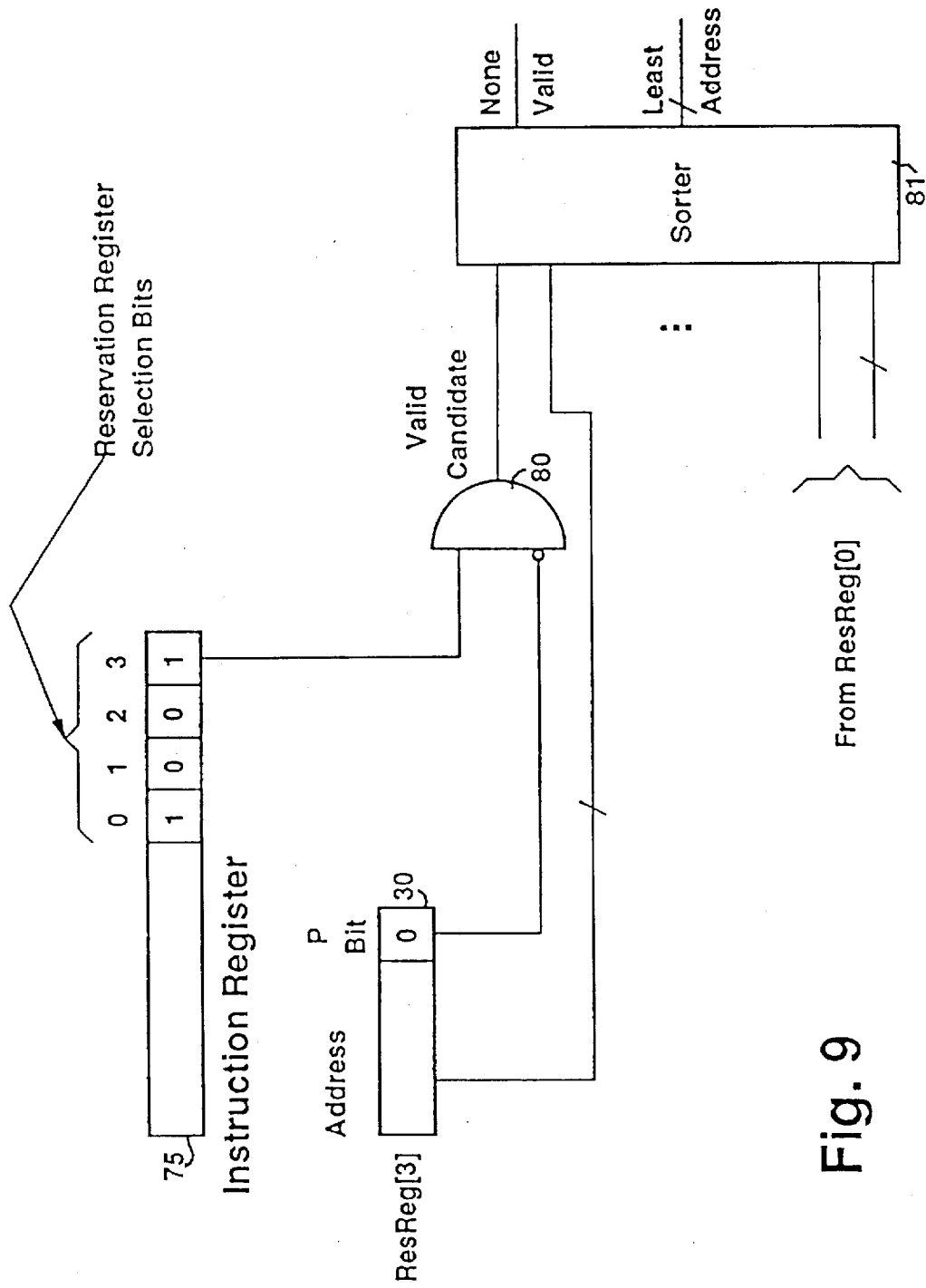
FIG. 9 is a block diagram showing an apparatus that finds the least selected address from within a group of reservation registers that do not have a write privilege.

The logic for selecting a candidate for a write-privilege request (block 63 in FIG. 7) is shown in FIG. 9. What is novel here is that the requests are ordered by ascending address. The intention is to defer conflicting incoming requests for write privilege, when possible. However, unless special steps are taken, the action of deferring incoming requests while awaiting completion of requests issued externally can lead to a deadlock situation in which two or more processors wait among themselves indefinitely, and no progress is possible thereafter. It is known in prior art that when requests by all processors are placed in a fixed order, then no deadlock will occur. [cf. Coffman, et al. 1971.] The invention follows this discipline by selecting the least selected address without write privilege as shown in FIG. 9.

The Write-if-Reserved instruction, which is resident in the instruction register, block 75, designates one or more reservation registers. The reservation register, block 30 in FIG. 9, contains an address of a reservation and a P bit to indicate if it has write privilege. The AND gate, block 80, produces a 1 bit if a corresponding reservation register is selected and does not have write privilege. The Sorter, block 81 in FIG. 9, produces a candidate address at its address output, and a binary signal at its None Valid output. If there are no candidates, None Valid will have a logic 1, otherwise will have a logic 0. The None Valid bit is tested in block 64 of FIG. 7.

Figure 10:
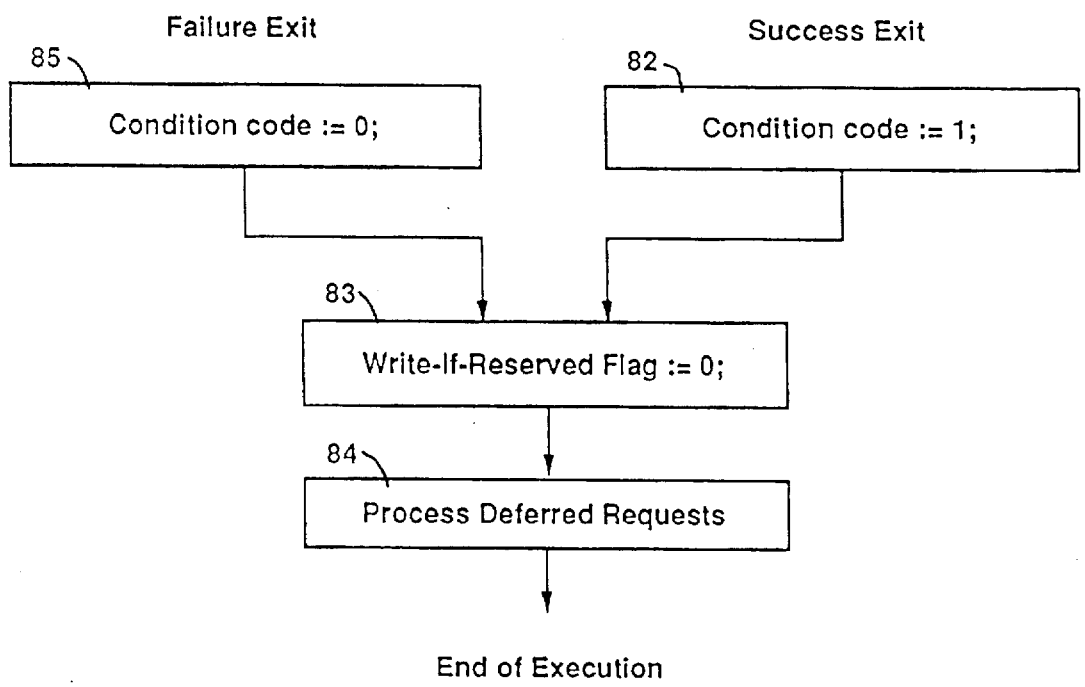
FIG. 10 is a flow chart showing how certain reservation register-fields are updated by the Write-if-Reserved instruction.

The success and failure exits of Write-if-Reserved, blocks 67 and 71 of FIG. 7, are described in more detail in FIG. 10. A condition code is set to indicate the outcome, and it is 0 on a failure (block 85) and 1 on a success (block 82). In either case, the act of exiting resets the Write-if-Reserved Flag in block 83 to signify normal handling of requests can be done. Block 84 performs the processing of incoming requests that were deferred during the execution of Write-if-Reserved. This is described in more detail later.

The heart of Write-if-Reserved is the Commit phase, block 66 of FIG. 7. It is described in detail in FIG. 11. At block 90, Commit selects an updated reservation from among the set of selected updated reservations. At block 91, Commit tests to determine if there are any candidates left. If so, it updates the candidate in its local cache in block 92, and sets the S bit to 0 to signify that the reservation has been removed. Commit returns to block 90 to select candidates again, and will not select the candidate just processed because the S bit has been reset. When no additional updates have to be performed, all other S bits are reset in block 94, and the Commit flag is reset in block 95 to signify that the Commit phase is over. Special handling of incoming requests is invoked during the Commit phase, and the resetting of the commit flag permits normal handling of incoming requests to resume.

Figure 12:
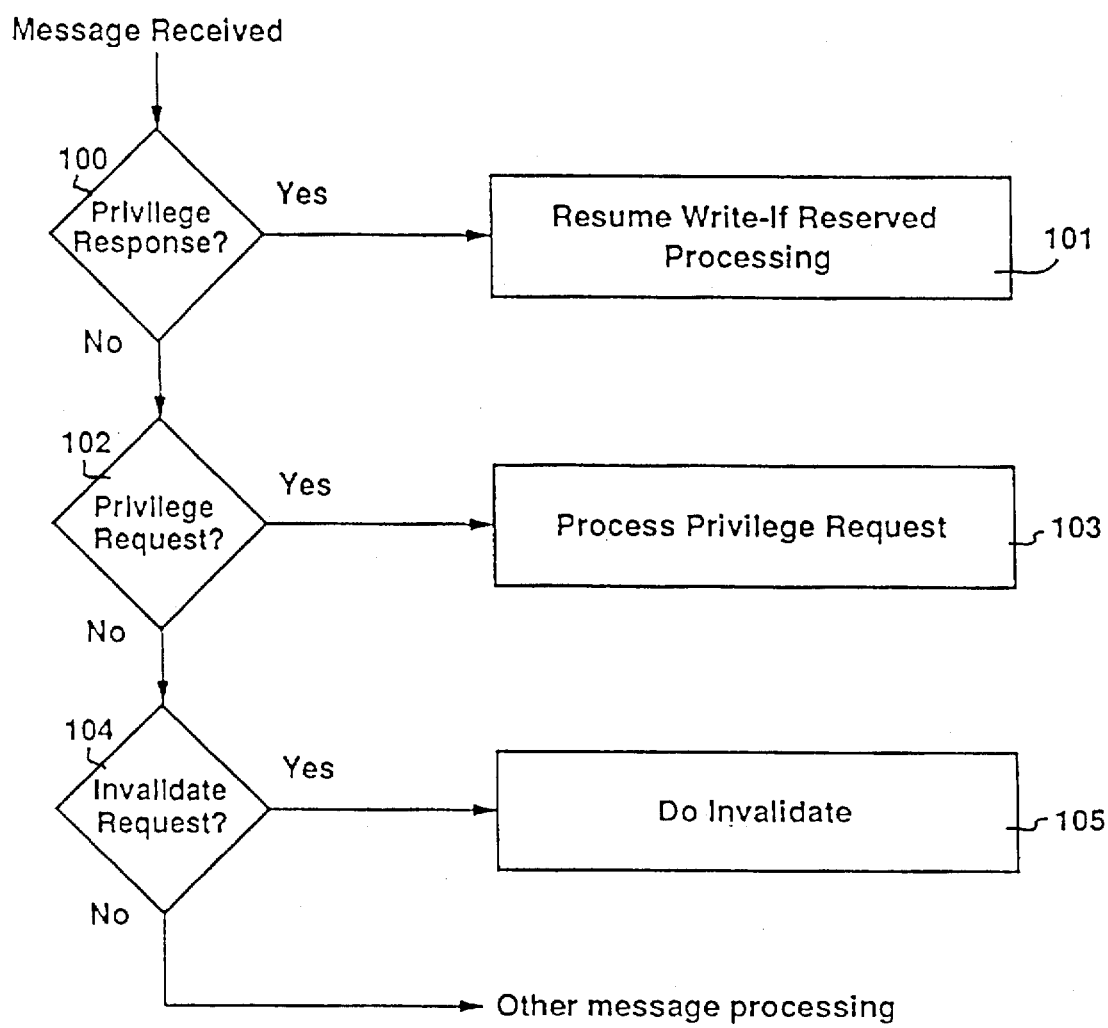
FIG. 12 is a flow chart that shows the actions of a network message receiver for implementing the reservation protocol.

FIG. 12 shows the logic functions of the receiver, in the control unit 23 of a processor 21, of incoming messages. At least three kinds of messages can be received. One is the response to a request for write privilege. A second is a request for write privilege. The third is a request to invalidate a cache entry because a processor with write privilege has changed the cache entry. Other messages may also be received but are not relevant to the reservation mechanism.

In blocks 100, 102 and 104, the receiver tests to see if the incoming message is one of the three types mentioned here. If so, the receiver performs the respective process cited in block 101, 103, and 105, respectively. When a response 100 to an outstanding write privilege request is received, the receiver notifies the Write-if-Reserved instruction to resume 101 processing at block 70 of FIG. 7. When a request 102 for write privilege is received, if the local processor has such privilege, the write privilege will be granted under some conditions, or deferred under other conditions and granted later. This is performed in block 103 of FIG. 12. How this is done is discussed later.

If an invalidate request 104 is received, the invalidate is performed immediately, as described later. Its action is represented by block 105.

Figure 13:
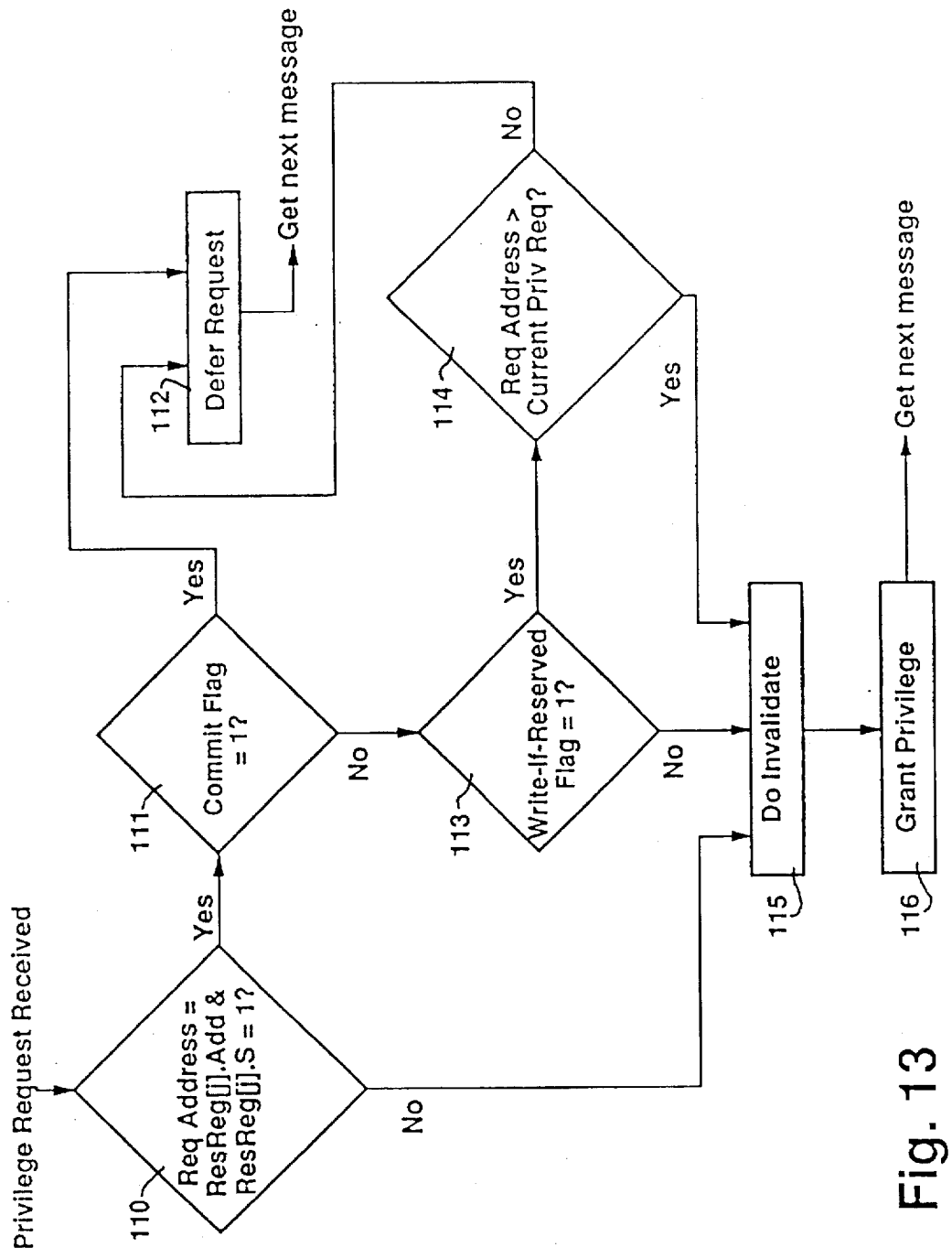
FIG. 13 is a flow chart that shows how privilege requests are processed by a network message receiver.

FIG. 13 shows the logic for deferring requests in a manner that will not cause deadlock. The objective is to request write privilege in the order of ascending address. The processor can defer requests for write privilege to any address less than the highest address for which it has a write-privilege request outstanding.

The processor may hold write privilege for higher addresses than the address of its current write-privilege request. If so, in order to avoid deadlock, the processor must give up write up privilege for such addresses if requests for them arrive.

In block 110 of FIG. 13, the message receiver detects that an incoming privilege request is intended for an address held in a reservation register whose S bit is 1, thereby indicating that the reservation is valid. If the Write-if-Reserved instruction is in the Commit phase, the request can be deferred until the end of the phase. This is tested in block 111, and the request is deferred in block 112. If not in Commit phase, block 113 tests to see if a Write-if-Reserved instruction is in execution by testing the Write-if-Reserved Flag at block 113. If so, and if the incoming request is for an address less than or equal to the address of the last outgoing request for privilege, the incoming request can be deferred. This is tested in block 114. In all other cases, the privilege request must be granted. This is done by doing an invalidate process in block 115 and granting the requested privilege in block 116. These processes are explained in more detail below.

Figure 14:
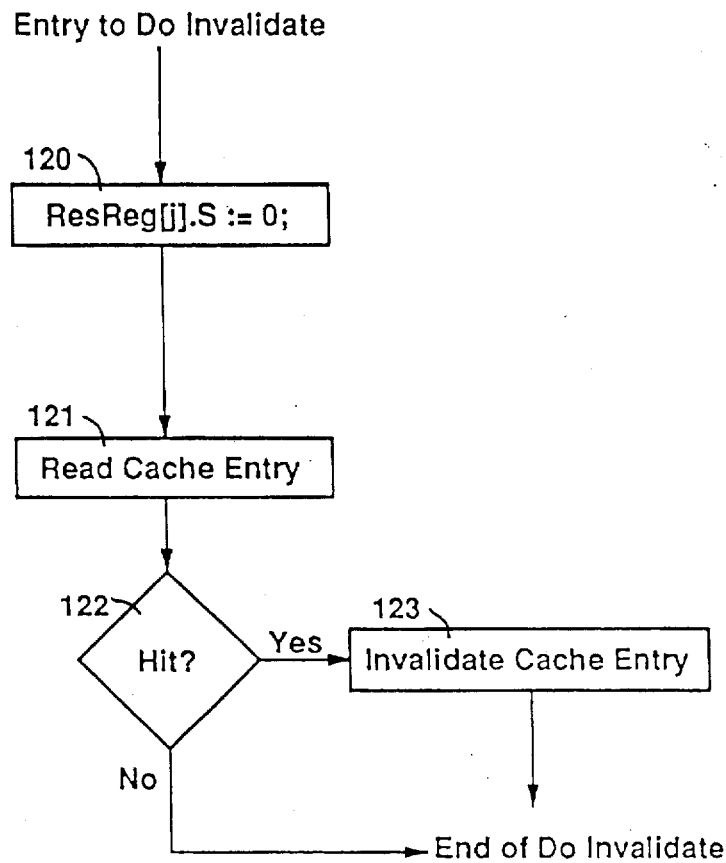
FIG. 14 is a flow chart that shows how a processor incorporates reservations into the cache protocol for cache invalidation.

The invalidate process (block 115 of FIG. 13) appears in FIG. 14. Block 120 shows that it sets the S bit of the matching reservation register to 0, and this will prevent the success of a current or subsequent Write-if-Reserved instruction. The invalidate signifies that a variable has changed value or will change value in the immediate future, and the reserved value of the shared variable can no longer be deemed to be the current value. In block 121, the processor reads the variable from cache. If the variable is in cache as tested by block 122, the cache entry is invalidated in block 123.

Figure 15:
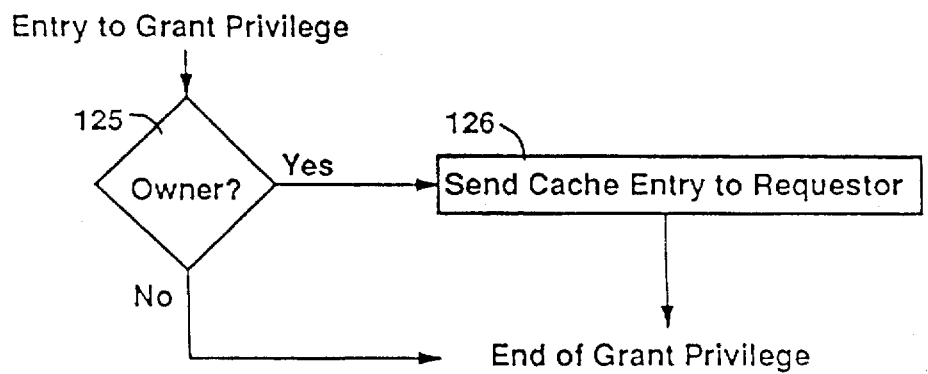
FIG. 15 is a flow chart that shows how the network message receiver grants write privilege to a requestor.

FIG. 15 shows a known process of granting privilege. Block 125 shows the processor testing for privilege, and this is performed on the contents of the entry read from cache. Block 126 shows privilege being transferred to the requester together with the data read from cache. This is known to be the current value of the data because the cache has write privilege associated with it.

Figure 16:
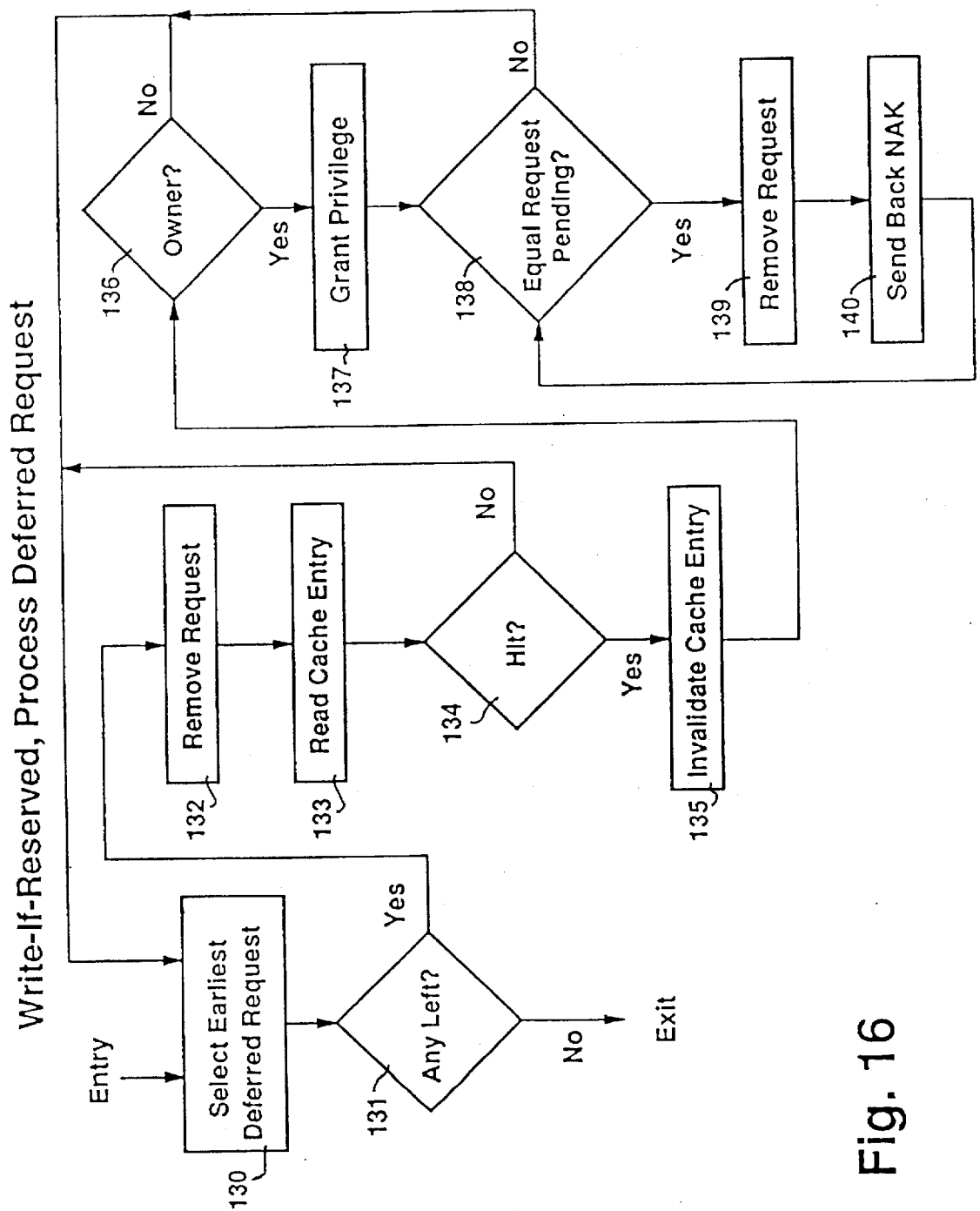
FIG. 16 is a block diagram that shows how deferred messages are processed after the completion of a Write-if-Reserved instruction.

FIG. 16 shows how Write-if-Reserved processes defer requests in block 84 of FIG. 10. Block 130 of FIG. 16 selects the requests in first-in, first-out order by selecting the earliest deferred request. Block 131 tests to see if any are left, and exits if not. Block 132 removes the request from the deferred-request queue, and block 133 accesses cache for the address requested. Block 134 tests to see if the address is in cache, because the cache entry may contain write privilege (ownership). If the item is not in cache, processing returns to block 130 to obtain a new request.

Assume momentarily that the item is in cache. The cache entry is invalidated at block 135, since write privilege will be transferred and the new owner will change the variable's value. Block 136 tests to see if the entry read from cache has write privilege. If not, processing returns to block 130 to obtain another deferred request.

If the current processor had ownership, it grants privilege at block 137. There may be other deferred requests for the same entry, and the new owner may have already received and rejected those requests. Therefore at block 138, the processor tests to see if another deferred request exists for the same item. For each such request, the processor removes the request from the deferred-request queue at block 139 and sends a negative acknowledgment (NAK) back to the requester at block 140 to tell the requester to repeat the request since ownership has just transferred.

It is not necessary to order the requests for write privilege as indicated in FIG. 9, block 81. If requests are not ordered, then incoming requests for write privilege cannot be deferred during non-Commit phase processing of Write-if-Reserved at block 113 of FIG. 13. However, they can and should be deferred during the Commit phase as indicated in block 111 of FIG. 13.

Figure 11:
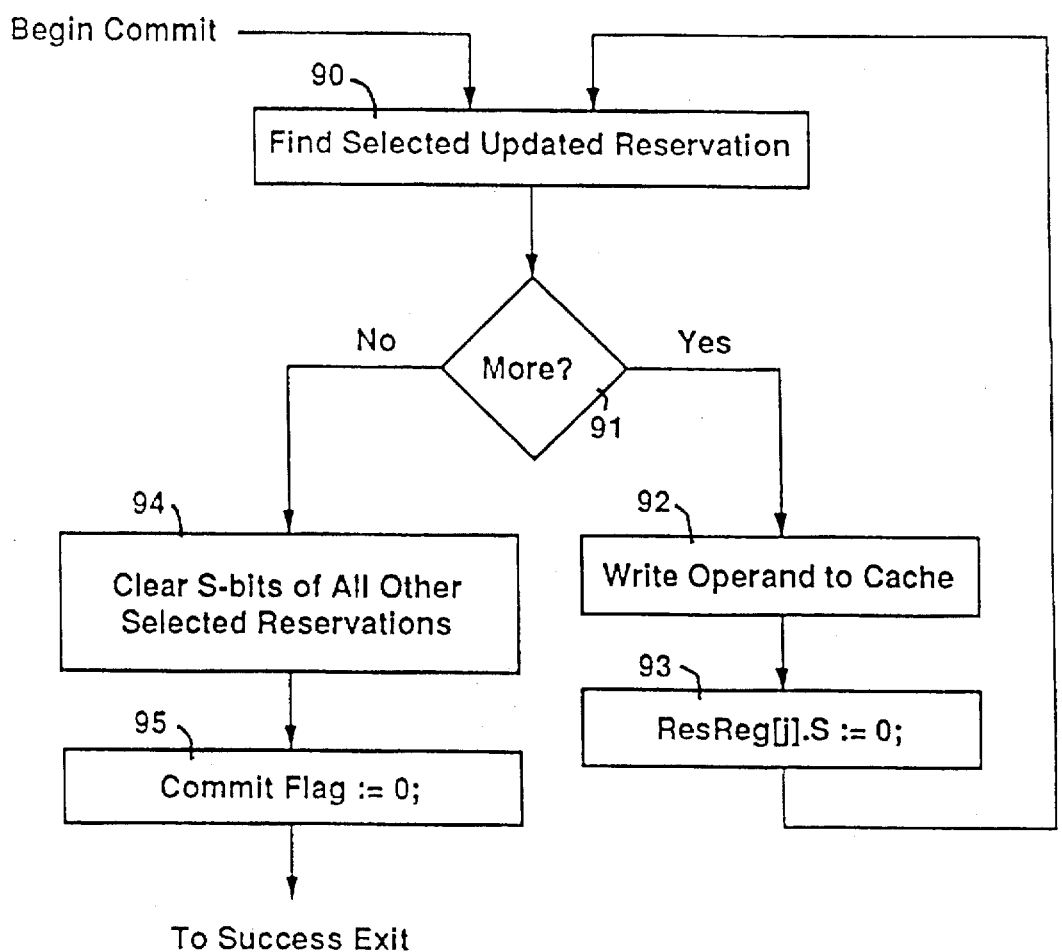
FIG. 11 is a flow chart showing how certain other reservation register fields are updated by the Write-if-Reserved instruction.

The atomicity of the update process is guaranteed by this invention through the means the Commit logic in FIG. 11 interacting with the handling of messages described in FIGS. 12 through 15. Once the Commit phase is started, reservations cannot be lost by invalidate operations or by granting write privilege to remote requests. Invalidates of reserved variables cannot occur during the Commit phase because write privilege has been obtained for all such variables, and therefore no other processor can change them. If a request for write privilege for a selected reserved variable is received during the Commit phase, the request is deferred and honored later. Interrupts and traps must be deferred during the Commit phase so that it can run to completion once it has started. Reservations must be invalidated when an interrupt in a processor changes context to another process that uses the same reservation registers.

Figure 17:
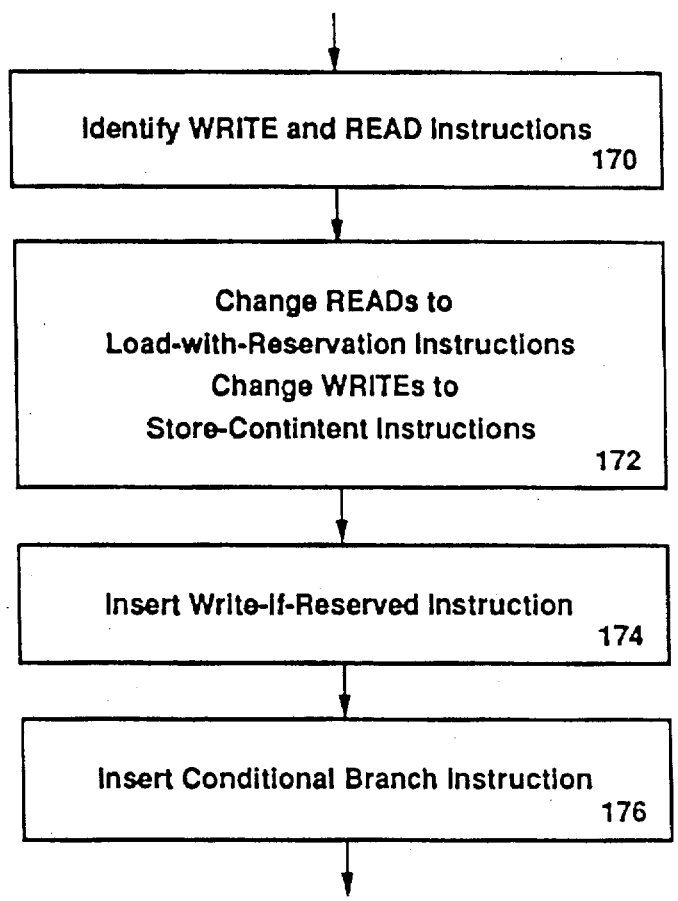
FIG. 17 is a flow chart that shows how to convert a single process algorithm into an algorithm that will run in a multiprocessing environment on a single processor or on a multiprocessor.

Using the present invention, an algorithm designed to operate in a uniprocessor can be effectively modified to work in a multiprocessor environment. See FIG. 17. To do this, first identify the WRITE and READ instructions 170 in the uniprocessor program that access variables that could be subject to modification by more than one process in a multiple processor environment or on which updates of these variables depends. These READ instructions are then changed 172 to Load-with-Reservation instructions and these WRITE instructions are changed 172 to Store Contingent instructions. Immediately following the last Store Contingent instruction, insert a Write-if-Reserved instruction 174 that designates the reservation registers used by the Load-with-Reservation instructions. Immediately after the Write-if-Reserved instruction, insert a conditional branch 176 back to the first Write-if-Reserved instruction, and construct the branch logic so that the branch is taken if the Write-if-Reserved instruction fails to update the shared variables. A multiprocessor environment as described in this disclosure is then created. Doing this creates customized atomic operations for a uniprocessor program that will run as a multiprocessor version of the algorithm in a multiprocessing environment. The multiprocessor algorithm will modify the collection of shared variables identified and guarantee that none of the variables in the collection have been modified by another process before any of them are updated.

This is a general solution for all classes of uniprocessor algorithms.

It will be evident to one skilled in the art having knowledge of this novel disclosure that there are many ways to carry out the teaching of this invention. These alternative embodiments are also contemplated by the inventors. For example, in the preferred embodiment, message handling hardware, like that performing the tasks shown in FIG. 12, and other control functions, like the commit flag, are located in the control unit 23 of each parallel processor 21. Alternatively, this hardware could be located in a hardware interface in a processor 21 that connects the processor 21 to the interconnection network 20. Other locations for these functions are also possible. Further, although the ResReg[j].U bit 34 is used in the preferred embodiment, this bit 34 could be omitted. In this case, all reservation registers 30 would be updated each time a Write-if-Reserve instruction is executed. In addition, the shared memory locations 28, or copies of the values in these locations, can exist in locations other than the main memory 25. These alternative locations can include queues and buffers that may reside on one or more of the processors 21. Further, although in FIG. 4, block 406, a reservation is invalidated if a remote processor modifies the reserved location, an alternative method could require that a reservation be cancelled if a remote processor performs a Load-with-Reservation from the location or if a remote processor modifies the location.

We claim:

1. A system of one or more computers in a multiprocessing environment, comprising:

one or more processors connected by an interconnection network to a main memory with one or more shared memory locations;

an arithmetic unit in each processor for calculating results;

a bank of one or more processor registers in each processor for storing calculated results;

a bank of more than one reservation register in each of one or more processors for reserving shared memory locations;

a control unit in each processor with control logic for controlling the arithmetic unit, processor registers, and reservation registers;

a cache memory for storing copies of the shared memory locations;

an address field, in each of the reservation registers, for storing the address of a shared memory location which will be reserved by the reservation register;

a validity field, in each of the reservation registers, for storing information indicating the validity of the reservation of the shared memory location;

a privilege field, in each of the reservation registers, for storing information indicating if the processor on which the reservation register resides has privilege to update the shared memory location of which the address is stored in the address field;

a data field, in each of the reservation registers, for storing modified results which are to update the shared memory location;

means for testing if each reservation in a designated set of reservations is valid during execution of a Write-if-Reserved instruction, the Write-if-Reserved instruction designating the designated set;

means for entering a commitment phase to atomically update the variables reserved by the designated set of reservations during the execution of the Write-if-Reserved instruction when all reservations are valid and the processors updating a set of two or more variables that have privilege to update those respective variables;

means for deferring the response to a request from a second processor for write privilege for access to an address of a reserved shared variable whose address is less than or equal to the last request for write privilege placed by a first processor when the first processor is executing a Write-if-Reserved instruction prior to entering the commitment phase;

means for deferring the response to a request from a second processor for write privilege for access to an address of a reserved shared variable when the first processor is executing a Write-if-Reserved instruction in its commitment phase; and means for producing a deferred response to respond to a request, a first deferred response granting write privilege and all subsequent deferred responses associated with a same address of the first deferred response causing a receiving processor to rerequest.

2. A system of one or more computers in a multiprocessing environment, as in claim 1, where the reservation register has an additional update field for indicating if the modified results have been written back to the shared memory location.

* * * * *